(12) United States Patent
Mochizuki

(10) Patent No.: US 8,794,805 B2
(45) Date of Patent: Aug. 5, 2014

(54) HANDLE COVER AND HEAD LIGHT FOR STRADDLE-TYPE VEHICLE

(75) Inventor: Kan Mochizuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1009 days.

(21) Appl. No.: 11/961,094

(22) Filed: Dec. 20, 2007

(65) Prior Publication Data

US 2008/0158901 A1 Jul. 3, 2008

(30) Foreign Application Priority Data

Dec. 28, 2006 (JP) ................... 2006-356656

(51) Int. Cl.
*B62J 6/00* (2006.01)
*F21V 33/00* (2006.01)

(52) U.S. Cl.
USPC .......................................... 362/475; 362/474

(58) Field of Classification Search
USPC ................. 362/473, 508, 523; 296/78.1, 192, 296/193.09
See application file for complete search history.

(56) References Cited

U.S. PATENT DOCUMENTS

2006/0181891 A1* 8/2006 Surawichai et al. .......... 362/474

FOREIGN PATENT DOCUMENTS

JP 09-193865 7/1997

* cited by examiner

*Primary Examiner* — Jason Moon Han
(74) *Attorney, Agent, or Firm* — Keating & Bennett, LLP

(57) ABSTRACT

A straddle-type vehicle with reduced conspicuousness of disagreement between contours of a handle cover and an adjacent head light. The head light swings substantially upward and downward. The handle cover covers the side of the head light. A handle cover end positioned on the side of the head light extends along the contour of a head light end positioned near the handle cover. The handle cover end has a concave and convex shape.

12 Claims, 5 Drawing Sheets

HANDLE COVER AND HEAD LIGHT FOR STRADDLE-TYPE VEHICLE

RELATED APPLICATIONS

This application claims the benefit of priority under 35 USC 119 of Japanese patent application no. 2006-356656, filed on Dec. 28, 2006, which application is hereby incorporated by reference in its entirety.

BACKGROUND OF THE INVENTION

1. Field of the Invention

The present invention relates to a straddle-type vehicle having a head light on a handle cover.

2. Description of Related Art

A straddle-type vehicle such as a motorcycle typically has a bar-shaped handle operated by a rider for changing the direction of a wheel. A handle cover may be provided to cover the periphery of the handle in order to improve the external appearance of the vehicle and to reduce air resistance during running. A head light may also be provided on the handle cover, wherein the upper portion and both sides of the head light are covered by the handle cover (for example, see JP-A-9-193865, page 4, FIG. 2).

The head light typically swings substantially upward and downward around a supporting member provided on the handle cover to adjust the optical axis of a light bulb in the head light, that is, to aim the head light. However, when the head light swings upward or downward in this manner, there is disagreement between contours of adjacent ends of the handle cover and the head light. As a result, the contour of the handle cover end may not agree with the contour of the head light end in a side view, which deteriorates the appearance of the head light and the handle cover, and diminishes the external appearance of the straddle-type vehicle.

SUMMARY OF THE INVENTION

The invention has been developed to solve these problems and provides a head light disposed on a handle cover with reduced conspicuousness of disagreement between the contours of adjacent ends of the handle cover and head light.

A straddle-type vehicle according to the invention comprises a wheel and a bar-shaped handle operated to change the direction of the wheel. A handle cover covers a periphery of the handle. A head light provided on the handle cover swings substantially upward and downward. The handle cover covers at least a side of the head light. A handle cover end positioned near the side of the head light extends along a contour of a head light end positioned near the handle cover in a side view. The handle cover end has a concave and convex shape in the side view.

According to the invention, the contours of adjacent ends of the handle cover and head light are in agreement, and the handle cover end has a concave and convex shape. Thus, even when the head light swings upward or downward, disagreement between the contours of the handle cover end and the head light end is inconspicuous. Thus, the external appearance of the vehicle is improved.

In one embodiment, the handle cover end has a projection that protrudes forward, and a recess is positioned behind the projection in the side view.

In another embodiment, the recess is positioned adjacent to and above the projection.

In a further embodiment, the projection gradually tapers forward.

In a still further embodiment, the upper surface of the projection is inclined forward in the side view.

The straddle-type vehicle according to the invention has a head light disposed on a handle cover with improved external appearance provided by reducing conspicuousness of disagreement between the contours of adjacent ends of the handle cover and the head light.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
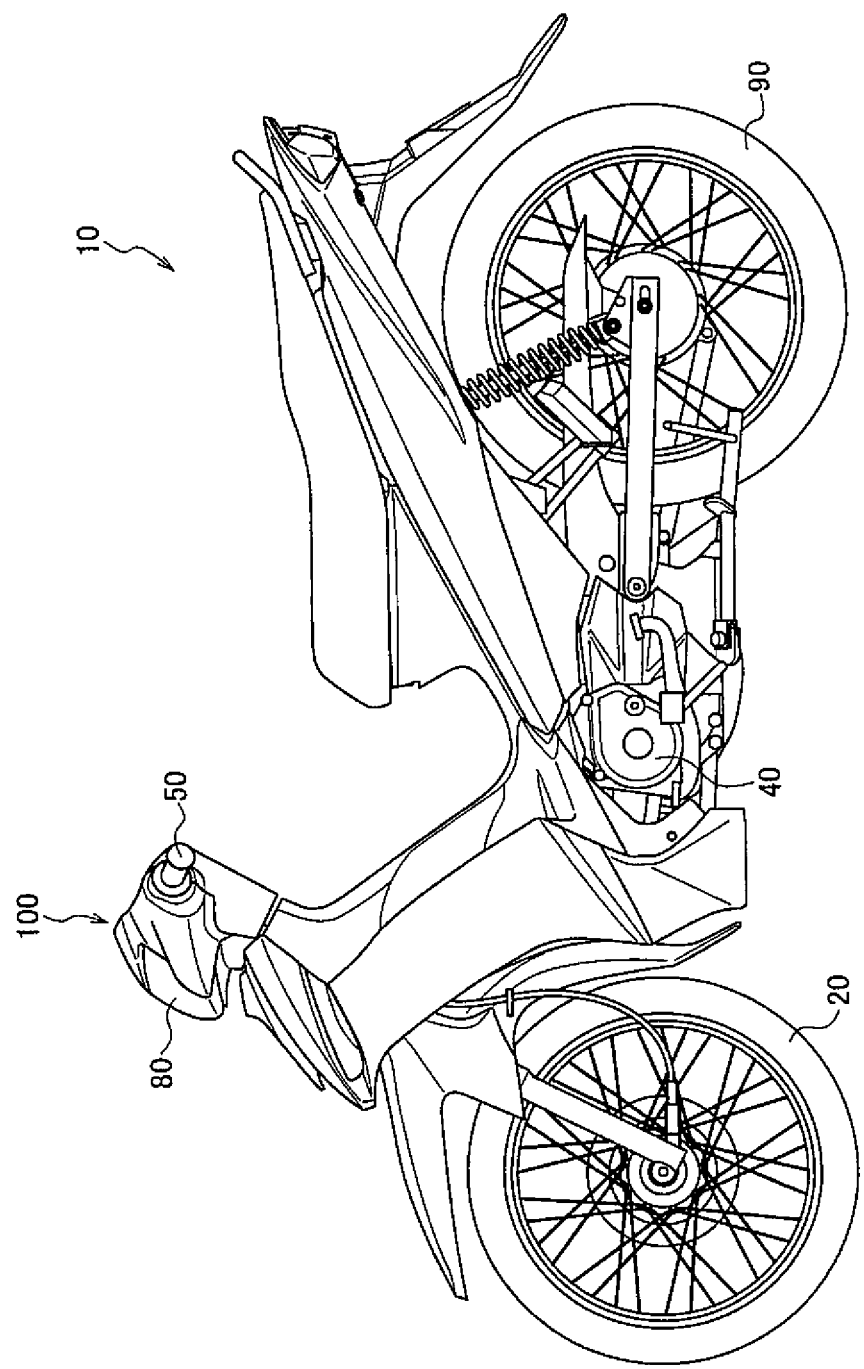
FIG. 1 is a left side view of a motorcycle according to an embodiment of the invention.

A straddle-type vehicle according to an embodiment of the invention is now described with reference to the drawings. In the following description, identical or similar reference numerals are given to identical or similar parts. It should be noted that the drawings are only schematic illustrations and may show size proportions or the like that are different from those practically used. The specific sizes or the like should be determined based on the following description. In addition, sizes and proportions may vary from figure to figure.

(Structure of Straddle-type Vehicle)

FIG. 1 is a left side view of a motorcycle 10 as a straddle-type vehicle according to an embodiment of the invention. Motorcycle 10 is an under-bone-type motorcycle that has a body frame disposed at a lower position than in the case of a typical straddle-type motorcycle. Motorcycle 10 has a front wheel 20 and a rear wheel 90 that is moved by driving force generated from an engine 40.

A bar-shaped handle 50 operated by a rider for changing the direction of rear wheel 20 is disposed above front wheel 20. The periphery of handle 50 is covered by a handle cover 100. A head light 80 for illuminating a space before motorcycle 10 is provided on handle cover 100.

(Structures of Head Light and Handle Cover)

Structures of head light 80 and handle cover 100 are now explained with reference to FIGS. 2-5.

(1) Entire General Structures of Head Light and Handle Cover

Figure 2:
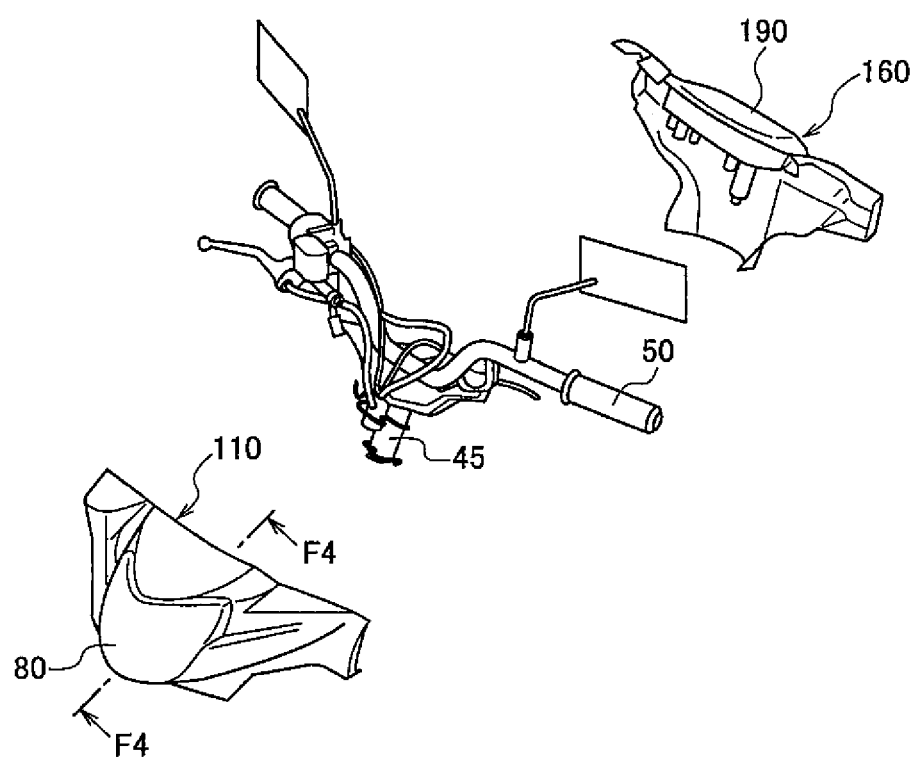
FIG. 2 is a perspective view of a disassembled head light and handle cover according to an embodiment of the invention.

FIG. 2 is a perspective view of the disassembled head light 80 and handle cover 100. As illustrated in FIG. 2, handle cover 100 is constituted by a front handle cover 110 and a rear handle cover 160. Head light 80 is attached to front handle cover 110. A meter panel 190 is attached to rear handle cover 160. Handle cover 100 covers the upper portion and sides of head light 80.

Head light 80 swings substantially upward and downward to adjust the optical axis of a light bulb 83 inside head light 80, that is, to aim head light 80.

Handle 50 is connected with a steering shaft 45. Rear handle cover 160 is fixed to handle 50, and front handle cover 110 is attached to rear handle cover 160.

(2) Side Shape of Handle Cover

Figure 3:
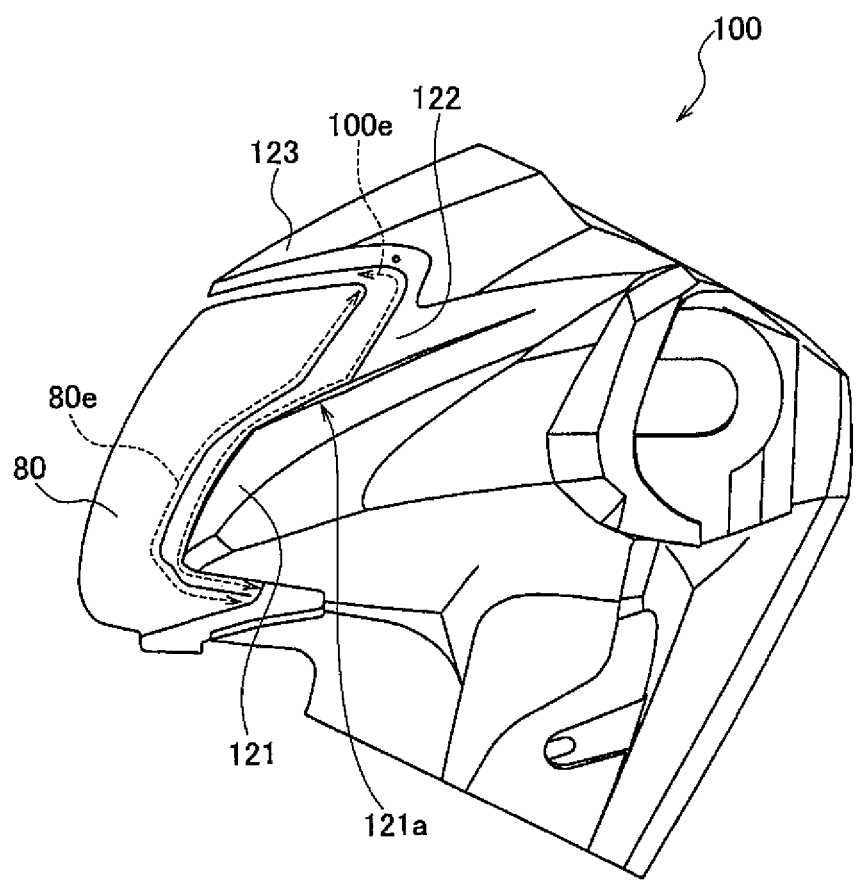
FIG. 3 is a side view of the handle cover.

FIG. 3 is a side view of handle cover 100. As illustrated in FIG. 3, a handle cover end 100e disposed on the side of head light 80 extends along the contour of a head light end 80e disposed in the vicinity of handle cover 100 in a side view. Thus, the line along the outer edge of handle cover end 100e is substantially in parallel with (i.e., has a contour matching) the line along the outer edge of head light end 80e.

Handle cover end 10e has a concave and convex shape in a side view. More specifically, handle cover end 10e is constituted by a projection 121, a recess 122, and a flange 123.

Projection 121 protrudes forward (toward the front of motorcycle 10) and has a tapered shape that gradually tapers forward. Recess 122 is positioned behind, above and adjacent to projection 121. An upper surface 121a of projection 121 is inclined forward in side view. Flange 123 is positioned above recess 122 and extends above head light 80. Flange 123 also extends forward to reach substantially the same level as that of projection 121 in the front direction.

(3) Aiming Function

Figure 4:
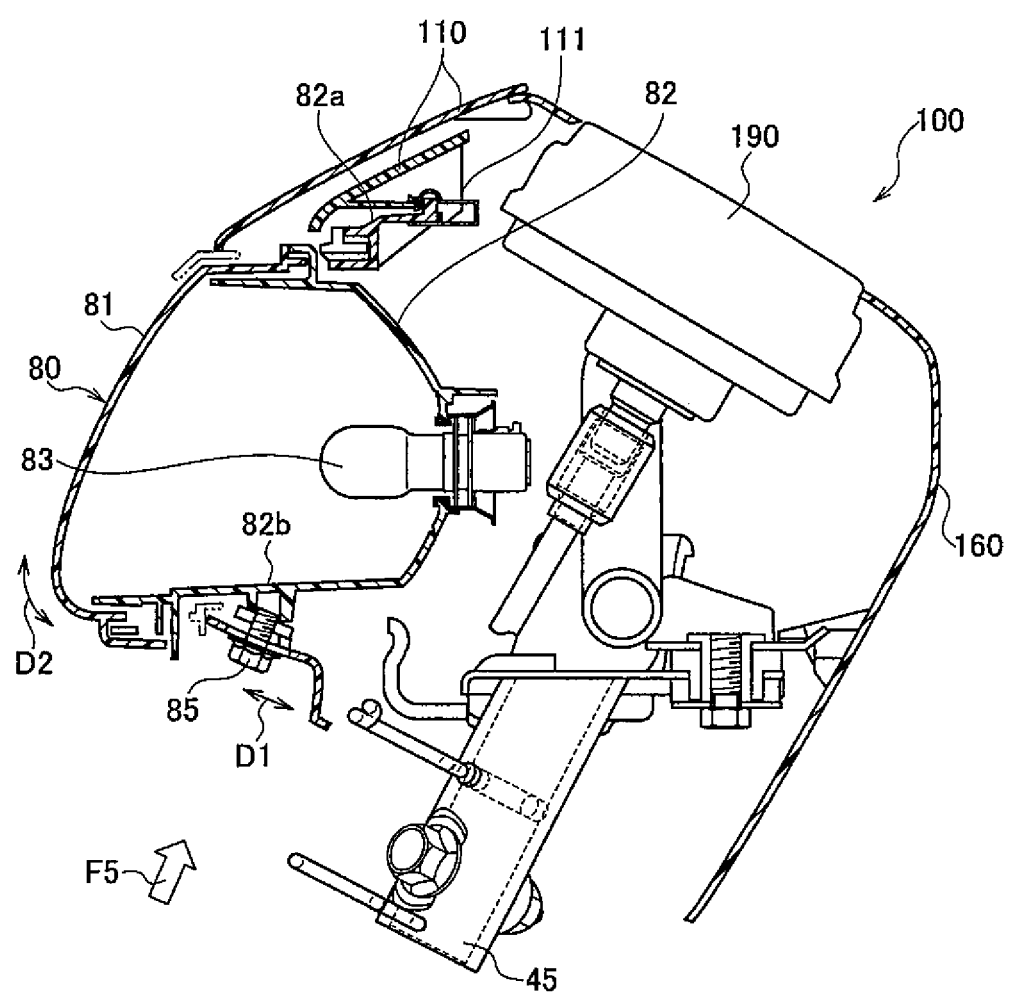
FIG. 4 is a cross-sectional view of the handle cover taken along line F4-F4 of FIG. 2.
Figure 5:
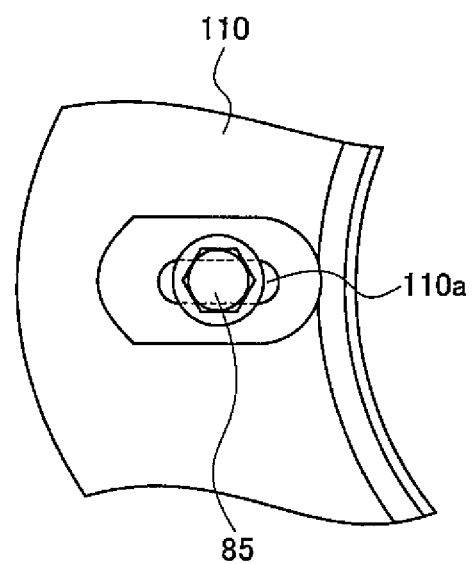
FIG. 5 illustrates the handle cover as viewed in a direction F5 of FIG. 4.

The aiming function of head light 80 is explained with reference to FIGS. 4 and 5. FIG. 4 is a cross-sectional view of handle cover 100 taken along line F4-F4 of FIG. 2. FIG. 5 illustrates handle cover 100 as viewed in a direction F5 of FIG. 4.

As illustrated in FIG. 4, head light 80 has a lens unit 81 and a reflector unit 82. Lens unit 81 is constituted by a lens made of transparent resin. Reflector unit 82 is disposed behind and attached to lens unit 81.

Reflector unit 82 has an upper engaging portion 82a and a lower engaging portion 82b. Upper engaging portion 82a engages with front handle cover 110 by a clip 111. Lower engaging portion 82b projects downward, and engages with an optical axis adjusting bolt 85. Head light bulb 83 is attached to the rear end of reflector 82. Reflector unit 82 reflects light emitted from head light bulb 83 toward the front.

The aiming (optical axis adjustment) function of head light 80 is performed by loosening optical axis adjustment bolt 85 and sliding optical axis adjustment bolt 85 in a direction D1. As illustrated in FIG. 5, an elongate hole 110a in which optical axis adjustment bolt 85 slides for a predetermined distance is formed on the bottom surface of handle cover 110. When optical axis adjustment bolt 85 slides in direction D1, head light 80 rotates in a direction D2 around upper engaging portion 82a.

(Operation and Advantage)

According to motorcycle 10, handle cover end 100e positioned on the side of head light 80 extends along the contour of head light end 80e positioned in the vicinity of the handle cover in a side view. In addition, handle cover end 100e has a concave and convex shape in a side view.

Thus, disagreement between the contours of handle cover end 100e and head light end 80e is inconspicuous even when head light 80 swings upward or downward for adjustment of the optical axis of head light bulb 83. As a result, the external appearance of motorcycle 10 is improved.

According to this embodiment, the concave and convex shape of handle cover end 100e is formed by projection 121 which protrudes forward and recess 122 positioned behind projection 121. Recess 122 is disposed adjacent to and located above projection 121. Thus, the convex and concave shape of handle cover end 100e has a simple structure constituted by only two parts: projection 121 and recess 122.

According to this embodiment, projection 121 has a tapered shape which gradually tapers forward. Upper surface 121a of projection 121 is also inclined forward. Thus, the convex and concave shape of handle cover end 100e is formed without increasing air resistance.

(Other Examples)

While an embodiment of the invention has been described, it should be understood that the description and drawings constituting a part of this disclosure do not limit the scope of the invention. Various alternatives in light of this disclosure will be apparent to those of skill in the art.

For example, while recess 122 is described as being disposed adjacent to and positioned above projection 121, projection 121 and recess 122 may not be located adjacent to each other.

It is therefore apparent that the invention includes various modes for carrying out the invention and examples not described herein. As such, the scope of the invention is limited only by the following claims.

The invention claimed is:

1. A vehicle comprising:
    a wheel;
    a handle arranged to change a direction of the wheel;
    a handle cover arranged to cover the handle; and
    a head light provided on the handle cover such that the handle cover is arranged to cover at least a side of the head light; wherein
    a side contour of the handle cover extends alongside a side contour of the head light in a side view of an exterior of the vehicle; and
    the side contour of the handle cover in the side view of the exterior of the vehicle includes a first concave recess arranged to oppose a convex portion of the side contour of the head light, a convex projection arranged to oppose a concave portion of the side contour of the head light, and a second concave recess positioned adjacent to and below the convex projection.

2. The vehicle according to claim 1, wherein the convex projection extends forward in the side view of the exterior of the vehicle, and the first concave recess is positioned rearward of the convex projection in the side view of the exterior of the vehicle.

3. The vehicle according to claim 1, wherein the first concave recess is positioned adjacent to and above the convex projection in the side view of the exterior of the vehicle.

4. The vehicle according to claim 1, wherein the convex projection has a tapered shape that tapers forward in the side view of the exterior of the vehicle.

5. The vehicle according to claim 4, wherein an upper surface of the convex projection is inclined forward in the side view of the exterior of the vehicle.

6. The vehicle according to claim 1, wherein the head light includes a bulb, a reflector unit, and a lens unit.

7. The vehicle according to claim 1, wherein a front end of the convex projection extends substantially vertically and substantially parallel to a front end of the head light in the side view of the exterior of the vehicle.

8. The vehicle according to claim 1, wherein the side contour of the handle cover extends substantially parallel to the side contour of the head light in the side view of the exterior of the vehicle.

9. The vehicle according to claim 1, wherein an upper surface of the second concave recess of the handle cover extends substantially horizontally in the side view of the exterior of the vehicle.

10. The vehicle according to claim 9, wherein the head light includes a second convex portion arranged to oppose the second concave recess of the handle cover in the side view of the exterior of the vehicle.

11. The vehicle according to claim 10, wherein an upper surface of the second convex portion of the head light extends substantially parallel to the upper surface of the second concave recess of the handle cover in the side view of the exterior of the vehicle.

12. The vehicle according to claim 1, wherein the head light includes:
- an upper engaging portion arranged to engage with the handle cover; and
- a lower engaging portion arranged to engage with an adjustment device; wherein
- the lower engaging portion of the head light is arranged to pivot about the upper engaging portion of the head light when the adjustment device permits movement of the lower engaging portion of the head light.

* * * * *